United States Patent
Gilbert

(10) Patent No.: US 12,205,293 B2
(45) Date of Patent: Jan. 21, 2025

(54) SYSTEM AND METHODS FOR SEGMENTING IMAGES

(71) Applicant: GE Precision Healthcare LLC, Waukesha, WI (US)

(72) Inventor: Andrew Gilbert, Oslo (NO)

(73) Assignee: GE PRECISION HEALTHCARE LLC, Waukesha, WI (US)

(*) Notice: Subject to any disclaimer, the term of this patent is extended or adjusted under 35 U.S.C. 154(b) by 538 days.

(21) Appl. No.: 17/547,137

(22) Filed: Dec. 9, 2021

(65) Prior Publication Data

US 2023/0186477 A1 Jun. 15, 2023

(51) Int. Cl.
*G06T 7/11* (2017.01)
*G06T 7/00* (2017.01)
*G06T 7/33* (2017.01)

(52) U.S. Cl.
CPC .............. *G06T 7/11* (2017.01); *G06T 7/0012* (2013.01); *G06T 7/337* (2017.01); *G06T 2207/10132* (2013.01); *G06T 2207/20081* (2013.01); *G06T 2207/30048* (2013.01)

(58) Field of Classification Search
CPC .......... G06T 7/11; G06T 7/337; G06T 7/0012
See application file for complete search history.

(56) References Cited

U.S. PATENT DOCUMENTS

| | | | | |
|---|---|---|---|---|
| 2015/0178938 A1* | 6/2015 | Gorman, III | ............ | G06T 7/174 382/131 |
| 2016/0093101 A1* | 3/2016 | Benedek | ................ | G06V 20/64 345/420 |
| 2016/0300343 A1* | 10/2016 | Gazit | .................... | G06T 7/0014 |
| 2019/0205606 A1* | 7/2019 | Zhou | ..................... | G06F 18/285 |
| 2021/0374947 A1* | 12/2021 | Shin | ..................... | G06V 10/776 |
| 2022/0067983 A1* | 3/2022 | Fidler | .................... | G06V 20/58 |
| 2023/0036451 A1* | 2/2023 | Hatamizadeh | ......... | G06V 20/20 |
| 2023/0069310 A1* | 3/2023 | Myronenko | ............. | G06T 7/11 |
| 2023/0145535 A1* | 5/2023 | Hatamizadeh | ........... | G06N 3/02 514/460 |

OTHER PUBLICATIONS

Østvik, A. et al., "Automatic Myocardial Strain Imaging in Echocardiography Using Deep Learning," Deep Learning in Medical Image Analysis and Multimodal Learning for Clinical Decision Support (DLMIA 2018), Lecture Notes in Computer Science, vol. 11045, Sep. 2018, 9 pages.

(Continued)

*Primary Examiner* — David Bilodeau
(74) *Attorney, Agent, or Firm* — McCoy Russell LLP

(57) ABSTRACT

Methods and systems are provided for identifying shape-based atypical segmentations. In one example, a method includes receiving a segmentation of a region of interest (ROI) of a medical image, the segmentation output by a segmentation model, calculating a confidence metric of the segmentation that indicates how well a shape of the segmentation can be encoded by an encoding of one or more principal modes of shape variation of a set of previously determined segmentations of the ROI, and responsive to the confidence metric meeting a predetermined condition relative to a threshold, displaying the segmentation, storing the segmentation, and/or using the segmentation in one or more downstream processes; otherwise, prompting a user to perform a manual segmentation.

20 Claims, 7 Drawing Sheets

(56) References Cited

OTHER PUBLICATIONS

Zhang, J. et al., "Fully Automated Echocardiogram Interpretation in Clinical Practice," Circulation, vol. 138, No. 16, Oct. 16, 2018, 13 pages.
Leclerc, S. et al., "Deep Learning for Segmentation Using an Open Large-Scale Dataset in 2D Echocardiography," IEEE Transactions on Medical Imaging, vol. 38, No. 9, Sep. 2019, 33 pages.

\* cited by examiner

SYSTEM AND METHODS FOR SEGMENTING IMAGES

TECHNICAL FIELD

Embodiments of the subject matter disclosed herein relate to medical imaging, and more particularly, to segmenting medical images.

BACKGROUND

Medical imaging, such as ultrasound, may be used to non-invasively probe the internal structures of a body of a patient and produce a corresponding image. Medical images of the internal structures may be saved for later analysis by a clinician to aid in diagnosis and/or displayed on a display device in real time or near real time. In some examples, computerized tools may be employed to identify internal structures, provide suggested diagnosis, perform automated measurements, and the like.

SUMMARY

In an embodiment, a method includes receiving a segmentation of a region of interest (ROI) of a medical image, the segmentation output by a segmentation model, calculating a confidence metric of the segmentation that indicates how well a shape of the segmentation can be encoded by an encoding of one or more principal modes of shape variation of a set of previously determined segmentations of the ROI, and responsive to the confidence metric meeting a predetermined condition relative to a threshold, displaying the segmentation, storing the segmentation, and/or using the segmentation in one or more downstream processes; otherwise, prompting a user to perform a manual segmentation.

The above advantages and other advantages, and features of the present description will be readily apparent from the following Detailed Description when taken alone or in connection with the accompanying drawings. It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

Various aspects of this disclosure may be better understood upon reading the following detailed description and upon reference to the drawings in which.

DETAILED DESCRIPTION

Figure 1:
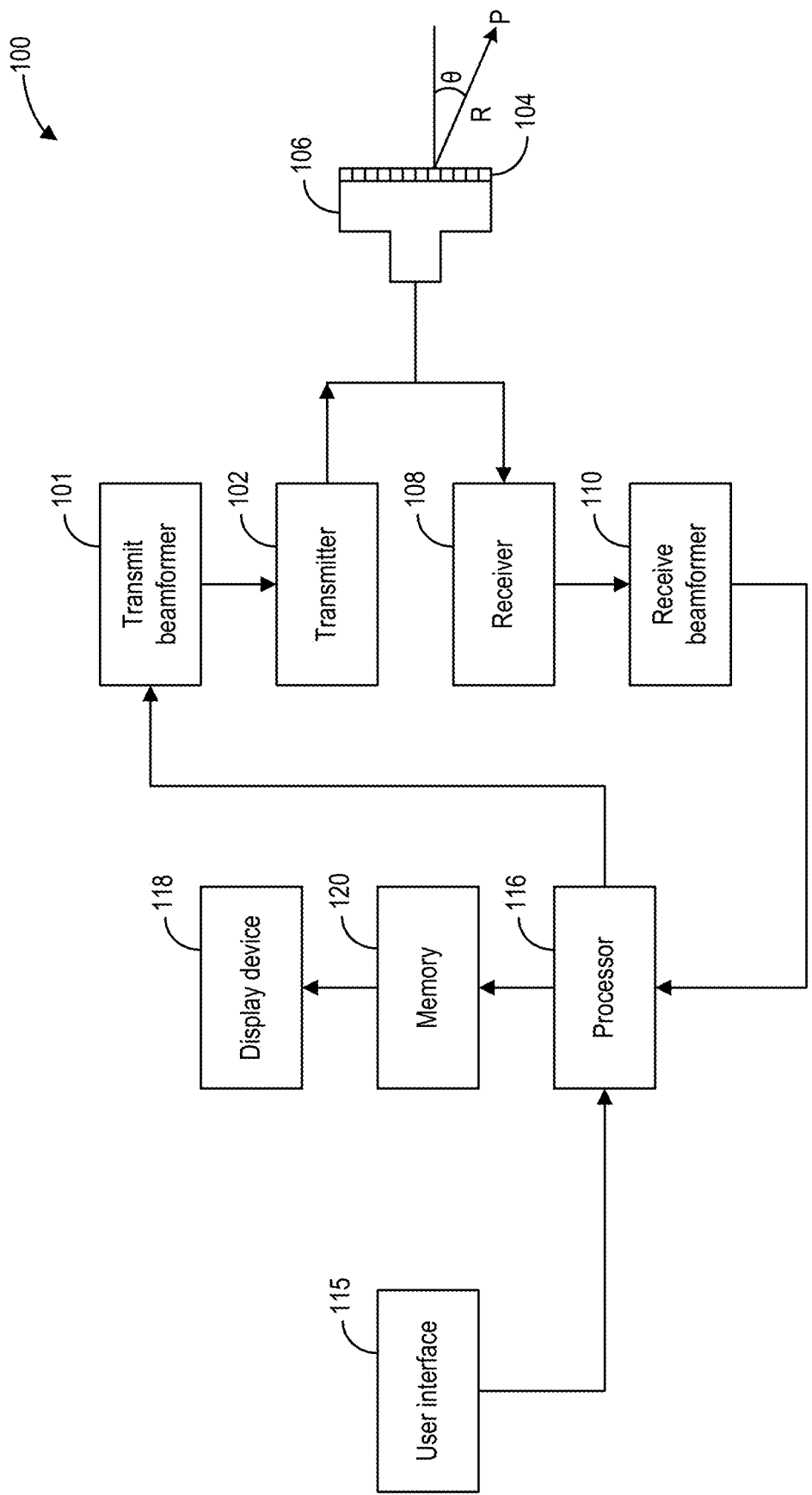
FIG. 1 shows a block diagram of an embodiment of an ultrasound system.

Medical images, such as ultrasound images, may be used to diagnose or rule out patient conditions in a non-invasive manner. To facilitate analysis of a patient condition, computerized tools may be applied to medical images in order to provide automated or semi-automated measurements of anatomical features, identify or characterize tissue, or even suggest diagnoses of patient conditions. As an example, during echocardiograms where a patient's heart is imaged with ultrasound, Automated Function Imaging (AFI) may be applied to perform 2D speckle tracking to measure deformation (strain) of the myocardial wall. However, these strain measurements may lack reproducibility due to differences in the initialization of the region of interest (ROI) that is used to track the cardiac tissue. Thus, to improve reproducibility, the ROI may be initialized automatically using a deep learning segmentation network, also referred to as a segmentation model.

However, deep learning models, while typically highly accurate in generating the ROI, are susceptible to generating outlier outputs where the shape of the segmentation does not match the expected shape of the relevant anatomy. When the segmentation model outputs an atypically-shaped ROI, errors may occur in the stain measurement, necessitating re-measurements or manual measurements that delay diagnosis and contribute to increased clinician cognitive load.

Thus, according to embodiments disclosed herein, atypical segmentation outputs may be identified by determining a confidence metric for each segmentation output that indicates a distance between the shape of the segmentation and an expected shape for the anatomical ROI. A large distance may be indicative that the shape of the segmentation is outside a range of shapes expected for the anatomical ROI, and thus a user may be notified of the atypical segmentation so that the user may perform a manual segmentation or input a different image for performing the segmentation. The confidence metric may be calculated by comparing the segmentation to a mean shape of the anatomical ROI identified from a plurality of confirmed segmentations of the anatomical ROI (e.g., labeled datasets generated by one or more experts). The segmentation output by the model may be registered to the mean shape using a Procrustes analysis to reduce any non-shape variations of the segmentation, such as size and rotation. The registered segmentation may be transformed to a lower dimensional shape and then reconstructed using one or more modes of variation identified from a Principal Component Analysis (PCA) of the labeled datasets. A distance between the shape of the reconstructed segmentation and the shape of the segmentation output by the model may be determined, and segmentations with a high degree of distance may be flagged and not used in further processing. In this way, a confidence metric of the segmentation that indicates how well a shape of the segmentation can be encoded by an encoding of one or more principal modes of shape variation of a set of previously determined segmentations of the ROI may be calculated and used to determine if the output segmentation should be used for further processing.

Figure 3:
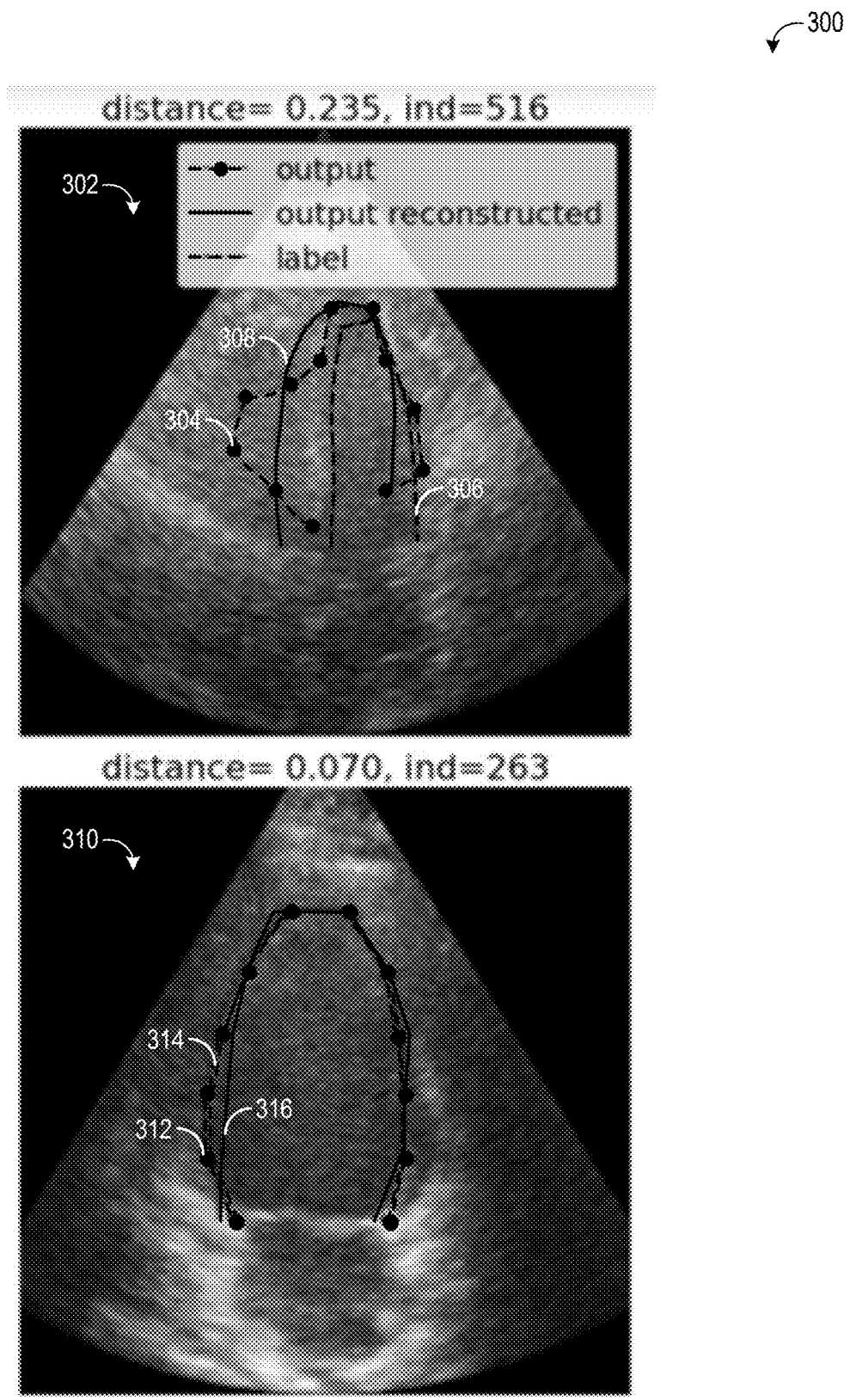
FIG. 3 schematically shows example segmentations of an anatomical region of interest (ROI)
Figure 4:
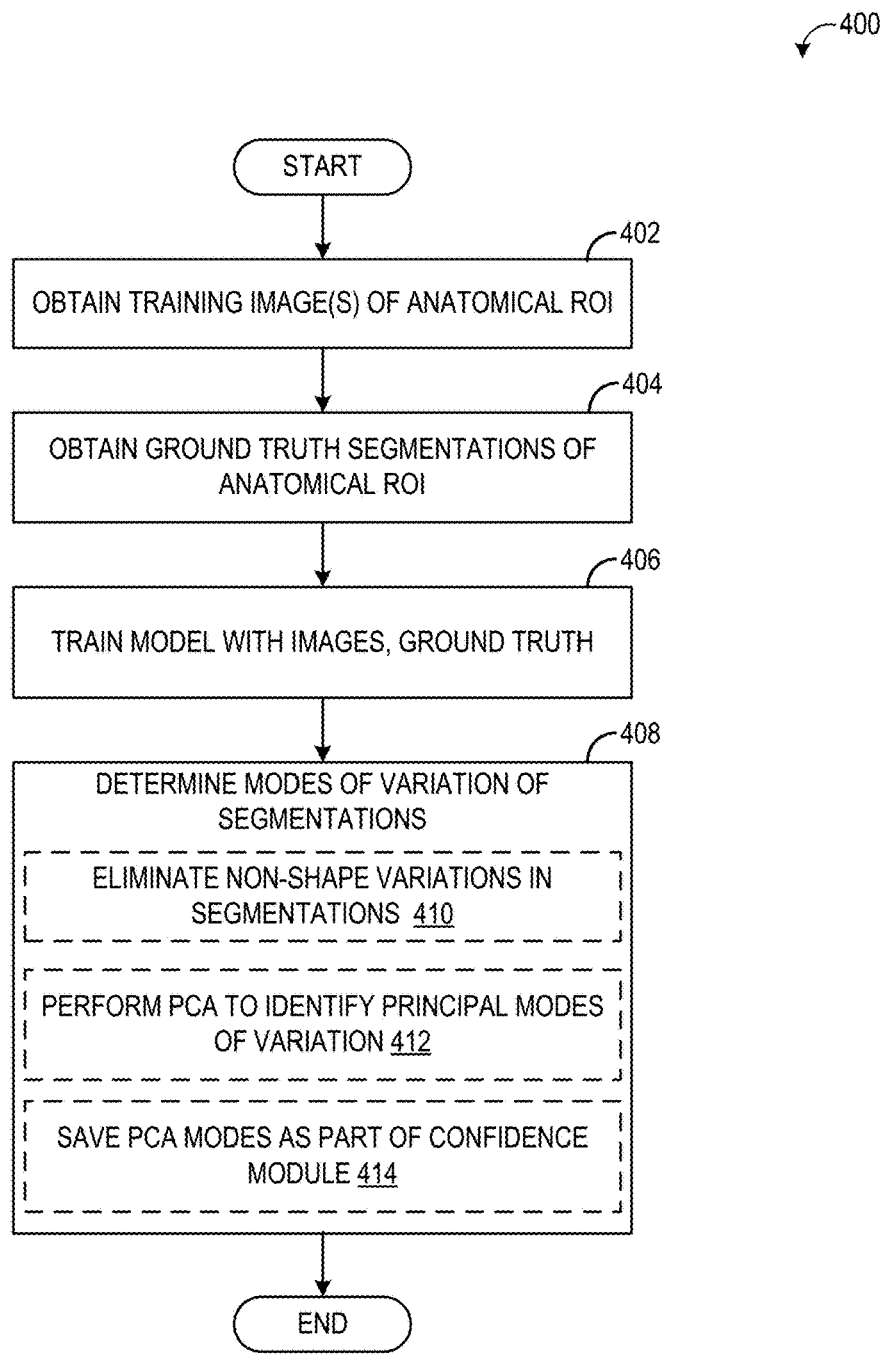
FIG. 4 is a flow chart illustrating a method for training a segmentation model to generate confidence metrics of segmentations using Principal Component Analysis (PCA)
Figure 5:
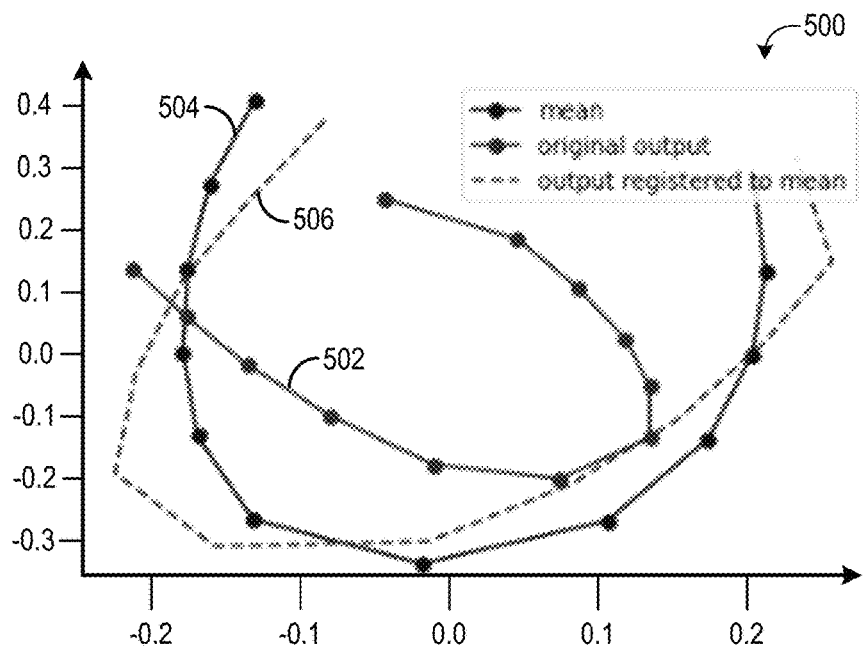
FIG. 5 shows an example of a Procrustes registration performed to reduce non-shape variations of a segmentation.

An example ultrasound system including an ultrasound probe, a display device, and an imaging processing system are shown in FIG. 1. Via the ultrasound probe, ultrasound data may be acquired and ultrasound images may be displayed on the display device. The ultrasound images may be processed by an image processing system, such as by the image processing system of FIG. 2, to segment an anatomical ROI and calculate a confidence metric of the segmentation. FIG. 3 shows example segmentations of an anatomical ROI, including model-generated segmentations and expert-generated segmentations. FIG. 4 shows an example method for training a segmentation model configured to generate confidence metrics of the segmentations generated by the segmentation model. The confidence metrics may be generated by reducing non-shape variations of the segmentations, such as applying a Procrustes registration as shown in FIG. 5, and reconstructing the segmentations by applying one or more main PCA modes of variation of a plurality of expert-generated segmentations, such as the PCA modes shown in FIG. 6, according to the method shown in FIG. 7. FIG. 8 illustrates a histogram of segmentation confidence metrics, showing separation between high-confidence and low-confidence segmentations.

The segmentation model and associated confidence metrics of the generated segmentations may be applied to medical images in order to identify an anatomical ROI for display and/or further processing. An example ultrasound imaging system usable to generate medical images that can be input to the segmentation model as disclosed herein is shown in FIG. 1. However, it is to be appreciated that an ultrasound imaging system is presented herein as an example medical imaging system and that the segmentation model and generated confidence metrics may be implemented with other medical images without departing from the scope of this disclosure, such as computed tomography (CT) images, magnetic resonance (MR) images, x-ray images, visible light images, and the like.

Referring to FIG. 1, a schematic diagram of an ultrasound imaging system 100 in accordance with an embodiment of the disclosure is shown. The ultrasound imaging system 100 includes a transmit beamformer 101 and a transmitter 102 that drives elements (e.g., transducer elements) 104 within a transducer array, herein referred to as probe 106, to emit pulsed ultrasonic signals (referred to herein as transmit pulses) into a body (not shown). According to an embodiment, the probe 106 may be a one-dimensional transducer array probe. However, in some embodiments, the probe 106 may be a two-dimensional matrix transducer array probe. As explained further below, the transducer elements 104 may be comprised of a piezoelectric material. When a voltage is applied to a piezoelectric crystal, the crystal physically expands and contracts, emitting an ultrasonic wave. In this way, transducer elements 104 may convert electronic transmit signals into acoustic transmit beams.

After the elements 104 of the probe 106 emit pulsed ultrasonic signals into a body (of a patient), the pulsed ultrasonic signals reflect from structures within an interior of the body, like blood cells or muscular tissue, to produce echoes that return to the elements 104. The echoes are converted into electrical signals, or ultrasound data, by the elements 104 and the electrical signals are received by a receiver 108. The electrical signals representing the received echoes are passed through a receive beamformer 110 that outputs ultrasound data.

The echo signals produced by transmit operation reflect from structures located at successive ranges along the transmitted ultrasonic beam. The echo signals are sensed separately by each transducer element and a sample of the echo signal magnitude at a particular point in time represents the amount of reflection occurring at a specific range. Due to the differences in the propagation paths between a reflecting point P and each element, however, these echo signals are not detected simultaneously. Receiver 108 amplifies the separate echo signals, imparts a calculated receive time delay to each, and sums them to provide a single echo signal which approximately indicates the total ultrasonic energy reflected from point P located at range R along the ultrasonic beam oriented at the angle $\theta$.

The time delay of each receive channel continuously changes during reception of the echo to provide dynamic focusing of the received beam at the range R from which the echo signal is assumed to emanate based on an assumed sound speed for the medium.

Under direction of processor 116, the receiver 108 provides time delays during the scan such that steering of receiver 108 tracks the direction $\theta$ of the beam steered by the transmitter and samples the echo signals at a succession of ranges R so as to provide the time delays and phase shifts to dynamically focus at points P along the beam. Thus, each emission of an ultrasonic pulse waveform results in acquisition of a series of data points which represent the amount of reflected sound from a corresponding series of points P located along the ultrasonic beam.

According to some embodiments, the probe 106 may contain electronic circuitry to do all or part of the transmit beamforming and/or the receive beamforming. For example, all or part of the transmit beamformer 101, the transmitter 102, the receiver 108, and the receive beamformer 110 may be situated within the probe 106. The terms "scan" or "scanning" may also be used in this disclosure to refer to acquiring data through the process of transmitting and receiving ultrasonic signals. The term "data" may be used in this disclosure to refer to either one or more datasets acquired with an ultrasound imaging system. A user interface 115 may be used to control operation of the ultrasound imaging system 100, including to control the input of patient data (e.g., patient medical history), to change a scanning or display parameter, to initiate a probe repolarization sequence, and the like. The user interface 115 may include one or more of the following: a rotary element, a mouse, a keyboard, a trackball, hard keys linked to specific actions, soft keys that may be configured to control different functions, and a graphical user interface displayed on a display device 118.

The ultrasound imaging system 100 also includes a processor 116 to control the transmit beamformer 101, the transmitter 102, the receiver 108, and the receive beamformer 110. The processor 116 is in electronic communication (e.g., communicatively connected) with the probe 106. For purposes of this disclosure, the term "electronic communication" may be defined to include both wired and wireless communications. The processor 116 may control the probe 106 to acquire data according to instructions stored on a memory of the processor, and/or memory 120. The processor 116 controls which of the elements 104 are active and the shape of a beam emitted from the probe 106. The processor 116 is also in electronic communication with the display device 118, and the processor 116 may process the data (e.g., ultrasound data) into images for display on the display device 118. The processor 116 may include a central processor (CPU), according to an embodiment. According to other embodiments, the processor 116 may include other electronic components capable of carrying out processing functions, such as a digital signal processor, a field-programmable gate array (FPGA), or a graphic board. According to other embodiments, the processor 116 may include multiple electronic components capable of carrying out processing functions. For example, the processor 116 may include two or more electronic components selected from a list of electronic components including: a central processor, a digital signal processor, a field-programmable gate array, and a graphic board. According to another embodiment, the processor 116 may also include a complex demodulator (not shown) that demodulates the real RF (radio-frequency) data and generates complex data. In another embodiment, the demodulation can be carried out earlier in the processing chain. The processor 116 is adapted to perform one or more processing operations according to a plurality of selectable ultrasound modalities on the data. In one example, the data may be processed in real-time during a scanning session as the echo signals are received by receiver 108 and transmitted to processor 116. For the purposes of this disclosure, the term "real-time" is defined to include a procedure that is performed without any intentional delay. For example, an embodiment may acquire images at a real-time rate of 7-20 frames/sec. The ultrasound imaging system 100 may acquire 2D data of one or more planes at a significantly faster rate. However, it should be understood that the real-time frame-rate may be dependent on the length of time that it takes to acquire each frame of data for display. Accordingly, when acquiring a relatively large amount of data, the real-time frame-rate may be slower. Thus, some embodiments may have real-time frame-rates that are considerably faster than 20 frames/sec while other embodiments may have real-time frame-rates slower than 7 frames/sec. The data may be stored temporarily in a buffer (not shown) during a scanning session and processed in less than real-time in a live or off-line operation. Some embodiments of the invention may include multiple processors (not shown) to handle the processing tasks that are handled by processor 116 according to the exemplary embodiment described hereinabove. For example, a first processor may be utilized to demodulate and decimate the RF signal while a second processor may be used to further process the data, for example by augmenting the data as described further herein, prior to displaying an image. It should be appreciated that other embodiments may use a different arrangement of processors.

The ultrasound imaging system 100 may continuously acquire data at a frame-rate of, for example, 10 Hz to 30 Hz (e.g., 10 to 30 frames per second). Images generated from the data may be refreshed at a similar frame-rate on display device 118. Other embodiments may acquire and display data at different rates. For example, some embodiments may acquire data at a frame-rate of less than 10 Hz or greater than 30 Hz depending on the size of the frame and the intended application. A memory 120 is included for storing processed frames of acquired data. In an exemplary embodiment, the memory 120 is of sufficient capacity to store at least several seconds' worth of frames of ultrasound data. The frames of data are stored in a manner to facilitate retrieval thereof according to its order or time of acquisition. The memory 120 may comprise any known data storage medium.

In various embodiments of the present invention, data may be processed in different mode-related modules by the processor 116 (e.g., B-mode, Color Doppler, M-mode, Color M-mode, spectral Doppler, Elastography, TVI, strain, strain rate, and the like) to form 2D or 3D data. For example, one or more modules may generate B-mode, color Doppler, M-mode, color M-mode, spectral Doppler, Elastography, TVI, strain, strain rate, and combinations thereof, and the like. As one example, the one or more modules may process color Doppler data, which may include traditional color flow Doppler, power Doppler, HD flow, and the like. The image lines and/or frames are stored in memory and may include timing information indicating a time at which the image lines and/or frames were stored in memory. The modules may include, for example, a scan conversion module to perform scan conversion operations to convert the acquired images from beam space coordinates to display space coordinates. A video processor module may be provided that reads the acquired images from a memory and displays an image in real time while a procedure (e.g., ultrasound imaging) is being performed on a patient. The video processor module may include a separate image memory, and the ultrasound images may be written to the image memory in order to be read and displayed by display device 118.

In various embodiments of the present disclosure, one or more components of ultrasound imaging system 100 may be included in a portable, handheld ultrasound imaging device. For example, display device 118 and user interface 115 may be integrated into an exterior surface of the handheld ultrasound imaging device, which may further contain processor 116 and memory 120. Probe 106 may comprise a handheld probe in electronic communication with the handheld ultrasound imaging device to collect raw ultrasound data. Transmit beamformer 101, transmitter 102, receiver 108, and receive beamformer 110 may be included in the same or different portions of the ultrasound imaging system 100. For example, transmit beamformer 101, transmitter 102, receiver 108, and receive beamformer 110 may be included in the handheld ultrasound imaging device, the probe, and combinations thereof.

After performing a two-dimensional ultrasound scan, a block of data comprising scan lines and their samples is generated. After back-end filters are applied, a process known as scan conversion is performed to transform the two-dimensional data block into a displayable bitmap image with additional scan information such as depths, angles of each scan line, and so on. During scan conversion, an interpolation technique is applied to fill missing holes (i.e., pixels) in the resulting image. These missing pixels occur because each element of the two-dimensional block should typically cover many pixels in the resulting image. For example, in current ultrasound imaging systems, a bicubic interpolation is applied which leverages neighboring elements of the two-dimensional block. As a result, if the two-dimensional block is relatively small in comparison to the size of the bitmap image, the scan-converted image will include areas of less than optimal or low resolution, especially for areas of greater depth.

Figure 2:
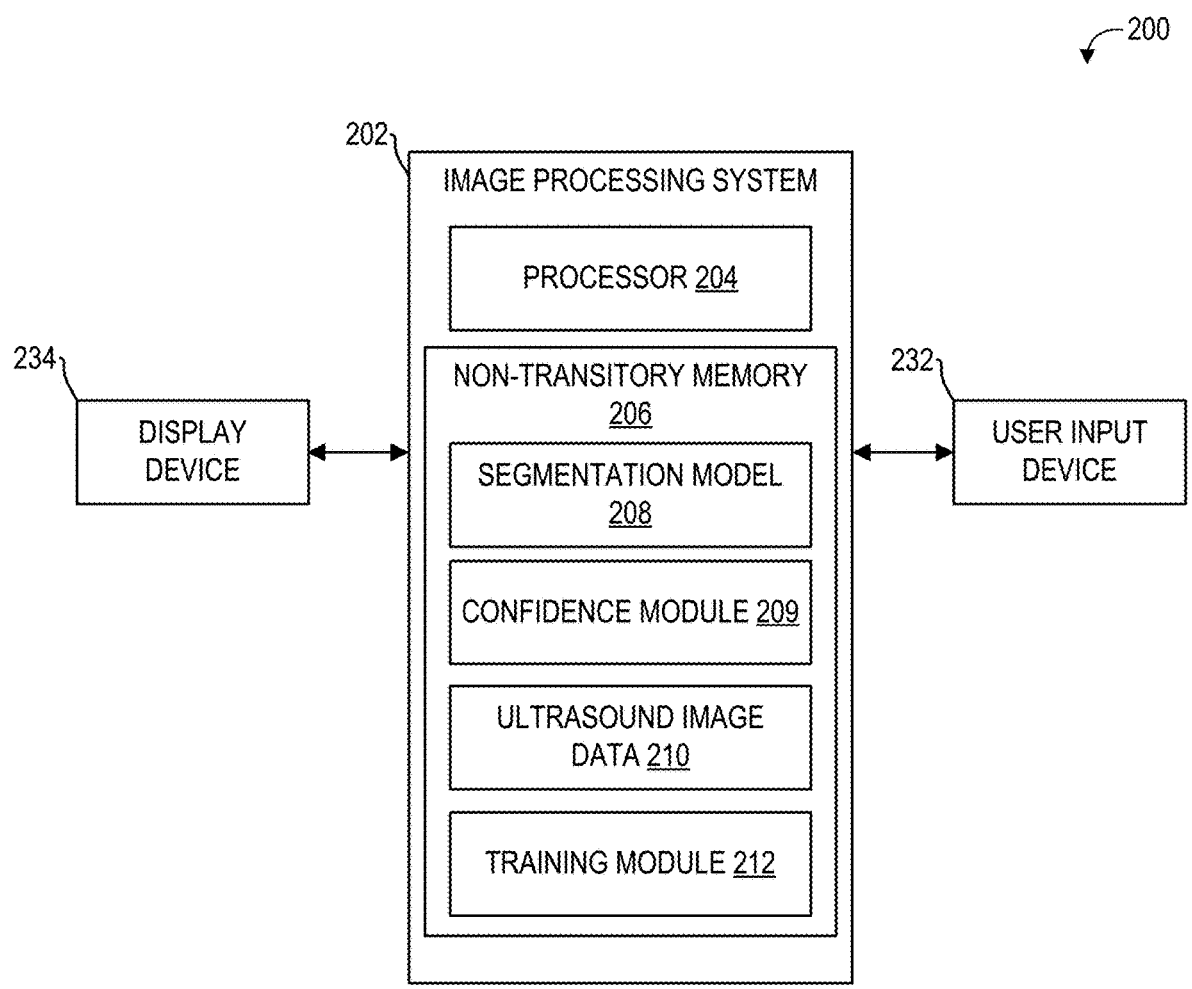
FIG. 2 is a block diagram showing an example image processing system.

Referring to FIG. 2, an image processing system 202 is shown, in accordance with an exemplary embodiment. In some embodiments, image processing system 202 is incorporated into the ultrasound imaging system 100. For example, the image processing system 202 may be provided in the ultrasound imaging system 100 as the processor 116 and memory 120. In some embodiments, at least a portion of image processing system 202 is included in a device (e.g., edge device, server, etc.) communicably coupled to the ultrasound imaging system via wired and/or wireless connections. In some embodiments, at least a portion of image processing system 202 is included in a separate device (e.g., a workstation), which can receive images from the ultrasound imaging system or from a storage device which stores the images/data generated by the ultrasound imaging system. Image processing system 202 may be operably/communicatively coupled to a user input device 232 and a display device 234. In one example, the user input device 232 may comprise the user interface 115 of the ultrasound imaging system 100, while the display device 234 may comprise the display device 118 of the ultrasound imaging system 100.

Image processing system 202 includes a processor 204 configured to execute machine readable instructions stored in non-transitory memory 206. Processor 204 may be single core or multi-core, and the programs executed thereon may be configured for parallel or distributed processing. In some embodiments, the processor 204 may optionally include individual components that are distributed throughout two or more devices, which may be remotely located and/or configured for coordinated processing. In some embodiments, one or more aspects of the processor 204 may be virtualized and executed by remotely-accessible networked computing devices configured in a cloud computing configuration.

Non-transitory memory 206 may store a segmentation model 208, a confidence module 209, ultrasound image data 210, and a training module 212. Segmentation model 208 may include one or more machine learning models, such as deep learning networks, comprising a plurality of weights and biases, activation functions, loss functions, gradient descent algorithms, and instructions for implementing the one or more deep neural networks to process input ultrasound images in order to segment a region of interest. Segmentation model 208 may include trained and/or untrained neural networks and may further include training routines, or parameters (e.g., weights and biases), associated with one or more neural network models stored therein. As will be explained herein, confidence module 209 may be configured to generate a confidence metric for each segmentation output by the segmentation model 208.

Ultrasound image data 210 may include ultrasound images captured by the ultrasound imaging system 100 of FIG. 1 or another ultrasound imaging system. The ultrasound image data 210 may include 2D images and/or 3D volumetric data, from which 2D images/slices may be generated. The ultrasound image data 210 may include B-mode images, Doppler images, color Doppler images, M-mode images, etc., and/or combinations thereof. In some embodiments, ultrasound image data 210 may store ultrasound images and ground truth output in an ordered format, such that each ultrasound image is associated with one or more corresponding ground truth outputs. However, in examples where training module 212 is not disposed at the image processing system 202, the images/ground truth output usable for training the segmentation model 208 may be stored elsewhere.

Non-transitory memory 206 may further include training module 212, which comprises instructions for training one or more of the machine learning models stored in segmentation model 208. In some embodiments, the training module 212 is not disposed at the image processing system 202. The segmentation model 208 thus includes trained and validated network(s). Further, in some examples, the segmentation model 208 may not be a deep learning model. Rather, the segmentation model 208 may be a computer vision-based model that may generate segmentations using computer vision techniques, such as edge detection.

In some embodiments, the non-transitory memory 206 may include components included in two or more devices, which may be remotely located and/or configured for coordinated processing. In some embodiments, one or more aspects of the non-transitory memory 206 may include remotely-accessible networked storage devices configured in a cloud computing configuration.

User input device 232 may comprise one or more of a touchscreen, a keyboard, a mouse, a trackpad, a motion sensing camera, or other device configured to enable a user to interact with and manipulate data within image processing system 202. In one example, user input device 232 may enable a user to make a selection of an ultrasound image to use in training a machine learning model, to indicate or label a border of an anatomical ROI in the ultrasound image data 210, or for further processing using a trained machine learning model.

Display device 234 may include one or more display devices utilizing virtually any type of technology. In some embodiments, display device 234 may comprise a computer monitor, and may display ultrasound images. Display device 234 may be combined with processor 204, non-transitory memory 206, and/or user input device 232 in a shared enclosure, or may be peripheral display devices and may comprise a monitor, touchscreen, projector, or other display device known in the art, which may enable a user to view ultrasound images produced by an ultrasound imaging system, and/or interact with various data stored in non-transitory memory 206.

It should be understood that image processing system 202 shown in FIG. 2 is for illustration, not for limitation. Another appropriate image processing system may include more, fewer, or different components.

Thus, the image processing system 202 may be configured to take a medical image, such as an ultrasound image, including an anatomical ROI such as the left ventricle of the heart and input the medical image to the segmentation model 208. The segmentation model 208 may generate a segmentation of the anatomical ROI from the input medical image. A confidence metric of the segmentation may be calculated by the confidence module 209 based on how well the shape of the segmentation matches a mean shape of prior, expert-confirmed segmentations of the anatomical ROI, taking into account principal modes of variation among the prior, expert-confirmed segmentations. The prior, expert-confirmed segmentations may be the ground truth segmentations used to train the segmentation model 208 to generate the segmentations, e.g., the ground truth stored with the ultrasound image data 210, or separate expert-confirmed segmentations. To determine the mean shape and principal modes of variation, a Procrustes analysis may be performed with the expert-confirmed segmentations to find the mean shape and register the expert-confirmed segmentations to the mean shape in order to reduce non-shape variations in the expert-confirmed segmentations, such as variations due to different size anatomical ROIs and different image orientations. A PCA may then be performed on the registered shapes to find the principal modes of shape variation across the expert-confirmed segmentations.

FIG. 3 shows a set of images 300 with example segmentations, including a first image 302 of a left ventricle of a first imaging subject and a second image 310 of the left ventricle of a second imaging subject. Each of the first image 302 and second image 310 may be entered as input to a trained segmentation model, which may output segmentations of the left ventricle. As shown on the first image 302, a segmentation output by the segmentation model is shown by line 304 (the dashed-dot line). The segmentation output by the model may have a different shape than a segmentation performed by an expert, shown by line 306 (the dashed line). In contrast, a segmentation output by the model for the second image 310 (shown by line 312) has a similar shape to an expert-generated segmentation (shown by line 314).

The embodiments disclosed herein allow for automatic detection of atypical shapes, such as the segmentation output by the model for the first image 302, without requiring an expert to generate a confirmed or known segmentation shape for each image. As will be explained in more detail below, the segmentation output by the model may be registered to a mean shape for the left ventricle and reconstructed in lower dimensional space with principal modes of variation for segmentations of the left ventricle. The reconstructed shape for the segmentation of the first image 302 is shown by line 308 (the solid line) and by line 316 for the second image 310. A confidence metric may be calculated by determining the distance between the shape of the segmentation output by the model (e.g., line 304) and the reconstructed shape (e.g., line 308). The distance between the shape of the segmentation output by the model and the reconstructed shape for the first image 302 is relatively high (e.g., 0.235, which may be above a threshold that indicates an atypical shape) compared to the distance between the shape of the segmentation output by the model and the reconstructed shape for the second image 310 (e.g., 0.070), confirming that the segmentation output by the model for the first image 302 does not fit within the distribution of shapes previously seen by expert annotators and thus may be classified as an atypical shape and flagged as potentially being an incorrect segmentation.

Turning now to FIG. 4, it shows a flow chart illustrating an example method 400 for training a segmentation model and building a confidence module configured to generate confidence metrics for segmentations output by the segmentation model. Method 400 is described with regard to the systems and components of FIGS. 1-2, though it should be appreciated that the method 400 may be implemented with other systems and components without departing from the scope of the present disclosure. Method 400 may be carried out according to instructions stored in non-transitory memory of a computing device, such as memory 120 of FIG. 1 or memory 206 of FIG. 2, and executed by a processor of the computing device, such as processor 116 of FIG. 1 or processor 204 of FIG. 2.

At 402, method 400 includes obtaining training images including an anatomical ROI. For example, the training images may be ultrasound images obtained with the ultrasound imaging system of FIG. 1 and the anatomical ROI may be a left ventricle of the heart. However, the training images may include images obtained with a different imaging modality (e.g., CT images, MR images, etc.) and/or including a different anatomical ROI (e.g., a different feature of the heart or a different anatomical structure such as the liver, kidney, etc.). However, the training images may all be acquired with the same imaging modality and may all include the same anatomical ROI, such that the segmentation model is trained to segment a specific anatomical ROI in specific medical images. At 404, method 400 includes obtaining ground truth segmentations of the anatomical ROI in the training images. The ground truth segmentations may be expert-generated labels/annotations. For example, one or more experts (e.g., clinicians) may evaluate the training images and generate the ground truth by manually (e.g., via a user input device) labeling/annotating the training images with the ground truth segmentations that indicate, for example, the border(s) of the anatomical ROI.

At 406, the segmentation model is trained with the training images and the ground truth segmentations. The segmentation model may be the segmentation model 208 of FIG. 2, prior to training. Training the segmentation model may include entering each training image as input to the segmentation model and updating one or more weights, biases, gradients, etc., of the segmentation model based on one or more losses between the output of the segmentation model and the associated ground truth segmentation. In some examples, the segmentation model may be trained to output a classification for each pixel in an input image based on characteristics of the input image, where the classification indicates whether that pixel belongs to the anatomical ROI or whether that pixel belongs to background (or another suitable classification). As such, the segmentation model may be trained in a shape-unaware manner of the anatomical ROI, which may lead to the segmentation model occasionally outputting atypical shapes.

Thus, a confidence module may be generated to evaluate the shape of each segmentation output by the segmentation mode. To generate the confidence module, at 408, method 400 includes determining one or more modes of variation of the ground truth segmentations. Determining the modes of variation may include eliminating non-shape variations in the segmentations, as indicated at 410. The non-shape variations may be eliminated by determining a mean shape of the segmentations and registering each segmentation to the mean shape using a Procrustes analysis. The Procrustes analysis allows a rotation/size invariant version of shape analysis by calculating a mean shape across a dataset and registering each new shape to minimize the rotation and size differences between the new shape and mean shape. Procrustes analysis works by normalizing both arrays (current mean A and sample B) to have 0 mean and norm 1. The optimal rotation matrix (R) and scale (s) are found from singular value decomposition (svd): U, W, $V^T$=svd($(B^T A)^T$); R=$VU^T$; s=$\Sigma W$.

Then B (the sample) is normalized using B=$BR^T$*s. Note that A and B are arrays of m×2 where m is the number of points (12 in the example figures) or [[$x_0$, $y_0$],[$x_1$,$y_1$], . . . [$x_m$,$y_m$]]. While the segmentations are shown herein as including 12 points, the segmentations may include more or fewer points without departing from the scope of this disclosure.

For generating the mean shape of the ground truth segmentations, a mean shape is first initialized. The mean shape that is first initialized may be one of the ground truth segmentations chosen at random or a mean shape generated by determining the mean position of each point of the segmentations across the entire set of ground truth segmentations. A Procrustes registration is performed for each shape of the ground truth segmentations (e.g., the labeled training dataset) to the initial mean shape. The mean shape is then recalculated with the registered shapes. If the mean shape has changed from the initial mean shape, the ground truth segmentation shapes are registered to the new mean shape, and a further updated mean shape is calculated. The process may be repeated until the mean shape stops changing. Once the mean shape stops changing, that mean shape (e.g., the final mean shape) may be saved as part of the confidence module (such as confidence module 209) or as part of the segmentation model.

Determining the modes of variation may further include performing a principal component analysis (PCA) to identify one or more principal modes of shape variation of the ground truth segmentations, as indicated at 412. The PCA may be performed to identify a relatively small (e.g., 2-3) number of dimensions that can be used to encode the primary shape variations seen in the ground truth segmentations. As will be explained in more detail below, the PCA modes may be applied to reconstruct the shape/segmentation once the segmentation model is trained and deployed to output segmentations. The PCA may be performed on the ground truth segmentations after the segmentations have been registered to the mean shape determined at 412. After the principal modes of variation are identified, the modes of variation (which may be referred to as PCA modes) may be saved as part of a confidence module, as indicated at 414. However, in other examples, the PCA modes may be saved as part of the trained segmentation model. Further, while FIG. 4 is described herein as determining the PCA modes using the ground truth segmentations that were also used to train the segmentation model, in some examples, a different set of expert-confirmed segmentations of the anatomical ROI may be used to generate the PCA modes. In such examples, the PCA modes may be generated independently of the training of the segmentation model.

FIG. 5 shows an example plot 500 of a Procrustes registration to a mean shape of an anatomical ROI, such as a left ventricle. Plot 500 includes a horizontal, x-axis with values increasing along the direction of the arrow and a vertical, y-axis with values increasing along the direction of the arrow. Plot 500 shows an original segmentation 502 output by a segmentation model, for example, or generated by an expert, plotted on the x- and y-axes. Plot 500 further includes a mean shape 504 generated via the Procrustes analysis described above (e.g., based on a plurality of prior, expert-confirmed segmentations of the anatomical ROI) plotted on the x- and y-axes. As shown, the mean shape 504 is plotted such that the centerpoint of the mean shape is positioned at the 0,0 point of the plot. Plot 500 also includes a registered shape 506 plotted on the x- and y-axes, which includes the original segmentation 502 registered to the mean shape 504 via Procrustes analysis/registration, as described above. As appreciated by plot 500, the registration to the mean shape results in an adjustment to the size and rotation of the original segmentation, but maintains the shape of the original segmentation. The mean shape 504 and the original segmentation 502 are each shown as including 12 points plotted on the coordinate system of FIG. 5, as explained above with respect to FIG. 4, though more or fewer points could be used without departing from the scope of this disclosure. In this way, the mean shape 504 may be a set of points plotted in an arbitrary coordinate system. The mean shape 504 is a mean shape of a plurality of segmentations of the anatomical ROI in a given imaging plane, is not determined directly from an anatomical atlas, and does not necessarily represent an actual 3D shape of the anatomical feature.

Figure 6:
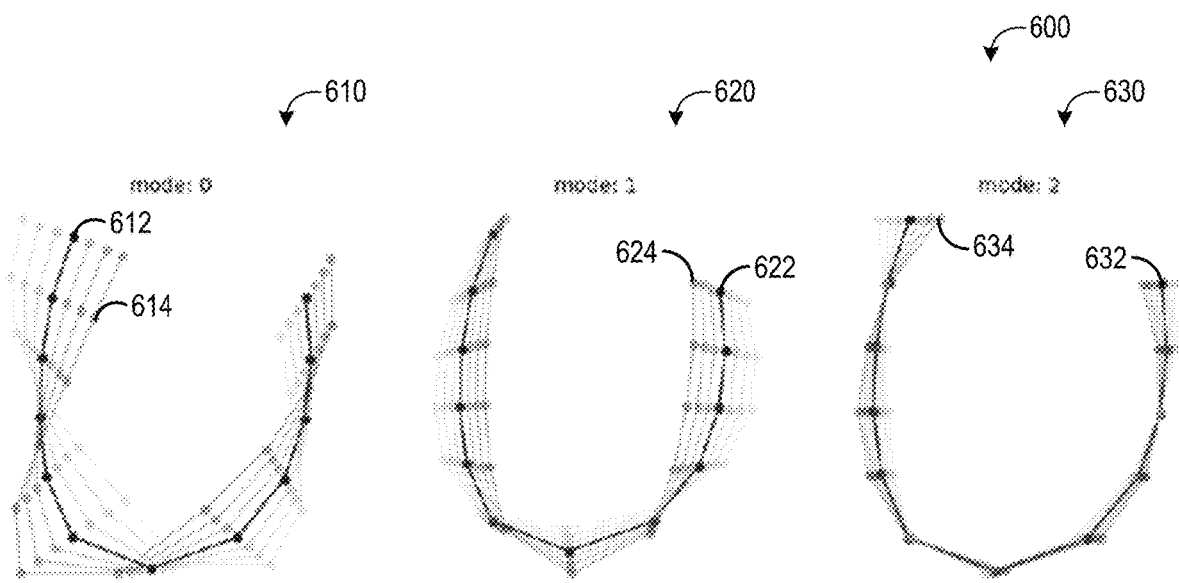
FIG. 6 shows example PCA modes of variation.

FIG. 6 shows an example set 600 of PCA modes identified via a PCA performed on a plurality of prior, expert-confirmed segmentations of an anatomical ROI, such as a left ventricle. The set 600 may be generated by the PCA performed as part of method 400, for example. The set 600 includes a first mode 610, referred to as mode 0. The first mode 610 may be orientation. Line 612 shows the mean shape while the other lines (e.g., line 614) show variations in the prior, expert-confirmed segmentations (e.g., the ground truth segmentations) with respect to the first mode (e.g., orientation). The set 600 includes a second mode 620, referred to as mode 1. The second mode 620 may be sphericity. Line 622 shows the mean shape while the other lines (e.g., line 624) show variations in the prior, expert-confirmed segmentations (e.g., the ground truth segmentations) with respect to the second mode (e.g., sphericity). The set 600 further includes a third mode 630, referred to as mode 2. The third mode 630 may be basal point position (e.g., the position of the end points of the shape). Line 632 shows the mean shape while the other lines (e.g., line 634) show variations in the prior, expert-confirmed segmentations (e.g., the ground truth segmentations) with respect to the third mode (e.g., with respect to the position of the end points of the shapes).

Figure 7:
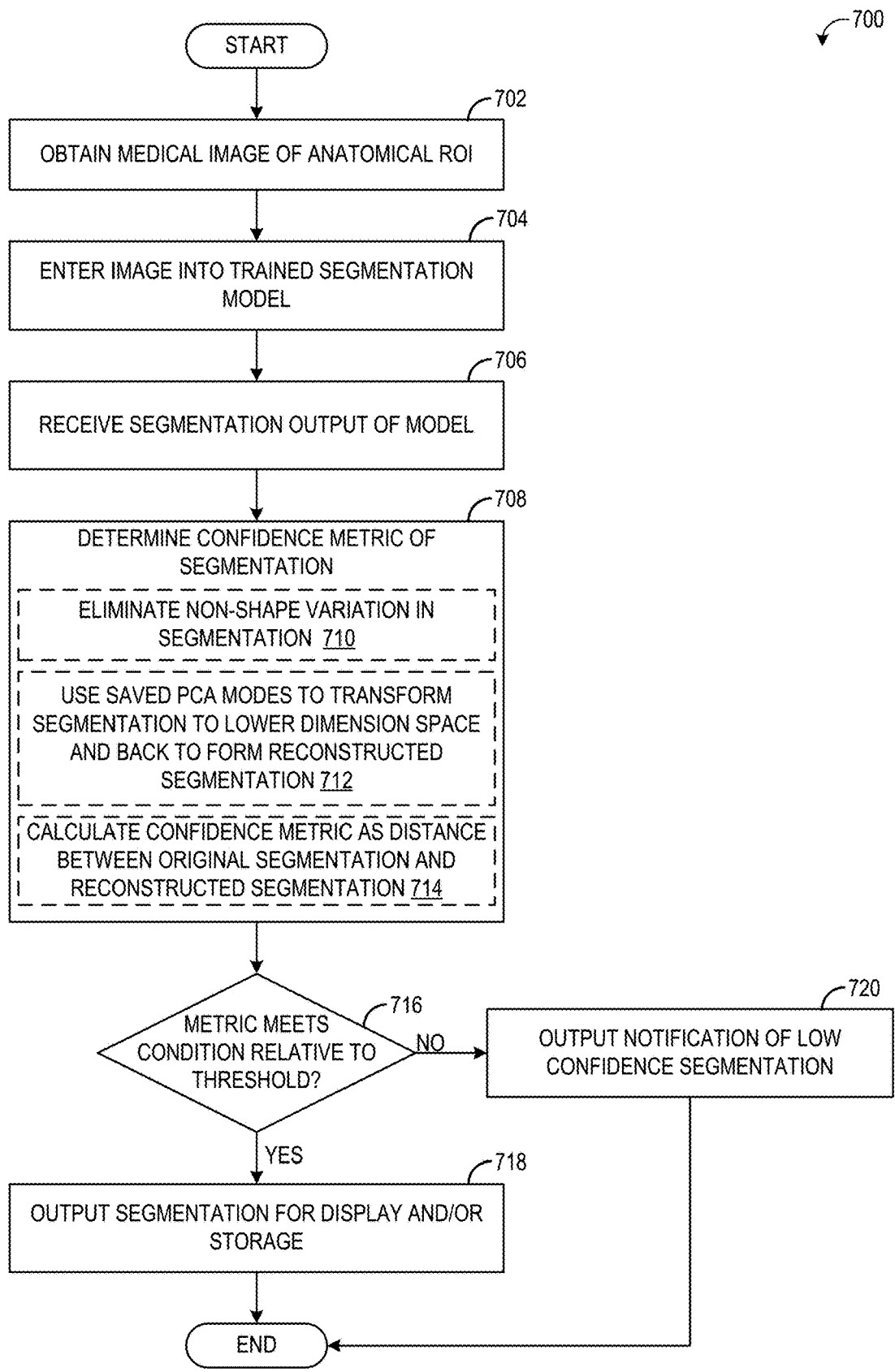
FIG. 7 is a flow chart illustrating a method for implementing a segmentation model.
Figure 8:
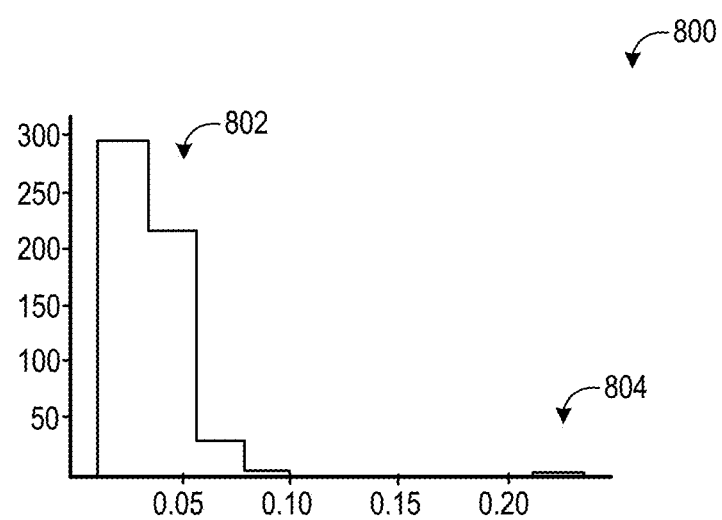
FIG. 8 shows a histogram of confidence metrics calculated for a plurality of segmentations.

FIG. 7 shows a flow chart illustrating an example method 700 for executing (e.g., deploying) a trained segmentation model during an inference stage and generating a confidence metric for a segmentation output by the segmentation model. Method 700 is described with regard to the systems and components of FIGS. 1-2, though it should be appreciated that the method 700 may be implemented with other systems and components without departing from the scope of the present disclosure. Method 700 may be carried out according to instructions stored in non-transitory memory of a computing device, such as memory 120 of FIG. 1 or memory 206 of FIG. 2, and executed by a processor of the computing device, such as processor 116 of FIG. 1 or processor 204 of FIG. 2.

At 702, a medical image of an anatomical ROI is obtained. The medical image may be an ultrasound image and the anatomical ROI may be the left ventricle of the heart, but other imaging modalities (e.g., CT, MRI) and/or other anatomical ROIs (e.g., brain, liver, other features of the heart, etc.) are possible without departing from the scope of this disclosure. The medical image may be identified via user input (e.g., an operator may enter a user input indicating that the medical image includes the anatomical ROI and should be segmented) or automatically (e.g., the computing device may determine that the medical image includes a standard imaging plane that includes the anatomical ROI and that the medical image should be segmented according to an imaging protocol or the like).

At 704, the medical image is entered as input to a trained segmentation model. The segmentation model may be a deep learning model trained to segment the anatomical ROI, such as the segmentation model 208 of FIG. 2 and/or the segmentation model trained according to the method of FIG. 4. At 706, the segmentation output of the segmentation model is received. The segmentation output may include a visual indication of the anatomical ROI overlaid on the medical image, or another suitable representation of the position, shape, size, etc., of the anatomical ROI within the medical image.

At 708, a confidence metric of the segmentation is determined. The confidence metric may indicate how well the shape of the segmentation output by the segmentation model matches a mean shape of the anatomical ROI (e.g., the mean shape discussed above with respect to FIG. 5). As explained previously, the mean shape is determined from a plurality of segmentations (e.g., expert-labeled medical images) and the mean shape is not determined from the current segmentation (e.g., the current medical image is not used to determine the mean shape). To determine the confidence metric, non-shape variations in the segmentation are eliminated (or at least reduced), as indicated at 710. The non-shape variations may be eliminated/reduced by registering the segmentation to the mean shape for the anatomical ROI, as performed via a Procrustes registration. The mean shape may be the mean shape determined at 410 of FIG. 4.

Determining the confidence metric further includes using saved PCA modes to transform the segmentation to a lower dimensional space and back, in order to form a reconstructed segmentation, as indicated at 712. As explained above with respect to FIG. 4, the PCA determines a set of primary dimensions of variation across a segmentation set (e.g., the plurality of prior, expert-generated segmentations). Each segmentation output by the segmentation model (e.g., the current segmentation output at 706) may then be stored (encoded) as only the position along each PCA dimension. The segmentations can also then be reconstructed using the dimensions and their positions along each dimension to determine the confidence metric. Thus, after being registered to the mean shape to reduce non-shape variations, the registered segmentation is transformed to lower dimensional space and reconstructed with the saved PCA modes. The saved PCA modes may be the PCA modes determined at 412 and saved at 414 of FIG. 4. The segmentation may be transformed to the lower dimensional space according to the equation $Y=(X-\mu)P^T$, where P is the components calculated with the PCA (e.g., the saved PCA modes) and $\mu$ is the mean shape. The segmentation may be transformed back to higher dimensional space to generate a reconstructed shape ($\hat{X}$) according to the equation $\hat{X}=(X-\mu)P^TP+\mu$. At 714, the confidence metric is calculated as a distance between the original segmentation X (e.g., the segmentation output by the segmentation model at 706) and the reconstructed segmentation $\hat{X}$. For example, the original segmentation and the reconstructed segmentation may each include a set of points (e.g., 12 points) that can be plotted on a common 2D coordinate system and the distance may be the sum of the squared distances between respective points of the reconstructed segmentation and the original segmentation, according to the equation $\|\hat{X}-X\|_2^2$.

At 716, method 700 determines if the confidence metric meets a predetermined condition relative to a threshold. For example, at 716, the method may determine if the confidence metric is lower than a threshold value. As shown in FIG. 3 and explained above, the confidence metric may be a distance between the original segmentation and the reconstructed segmentation and thus a lower distance (e.g., a lower confidence metric) may indicate a higher degree of shape matching between the original segmentation and the reconstructed segmentation. As shown in FIG. 3, the reconstruction of the segmentation output by the segmentation model for the first image 302 has a distance of 0.235 relative to the original segmentation, which may be above the threshold, while the reconstruction of the segmentation output by the segmentation model for the second image 310 has a distance of 0.070 relative to the original segmentation, which may be below the threshold. As such, the segmentation of the first image may be identified as being atypical.

The threshold demarcating typical and atypical segmentations may be determined empirically based on the confidence metrics calculated for a plurality of segmentations. For example, FIG. 8 shows a histogram 800 of confidence metrics calculated as explained herein with respect to FIG. 7. A first set of bins 802 of the histogram may include segmentations with confidence metrics ranging from 0-0.10 and a second set of bins 804 may include segmentations with confidence metrics greater than 0.20. Thus, the threshold may be set between 0.10 and 0.20, such as 0.15. While the confidence metric is described herein as being equal to the calculated distance, in some examples, the confidence metric may be determined as one minus the calculated distance, such that higher confidence metrics are indicative of smaller distances. In such examples, the threshold may be a different value (e.g., 0.85) and segmentations with confidence metrics below the threshold may be determined to be atypical.

Returning to FIG. 7, if the confidence metric does meet the condition relative to the threshold (e.g., the confidence metric is below the threshold), method 700 proceeds to 718 to output the segmentation for display, storage, and/or use in downstream processes. Because the confidence metric met the condition relative to the threshold, the segmentation output by the segmentation model may be considered a typical shape, and thus the segmentation may be used for one or more downstream processes, such as calculating strain, ejection fraction, and the like. In some examples, the segmentation may be utilized by a different model to automatically calculate the strain, ejection fraction, etc. In some examples, the confidence metric may be displayed on a display device, such as display device 234, along with the medical image and the segmentation. When the confidence metric meets the condition relative to the threshold, the original segmentation (the segmentation output by the segmentation model) may be displayed, stored, and/or used in downstream processes, and the original segmentation may not be corrected or altered, at least in some examples. Method 700 then ends.

If the confidence metric does not meet the condition relative to the threshold, method 700 proceeds to 720 to output a notification indicating that the segmentation output by the segmentation model is a low confidence segmentation, e.g., that the segmentation has an atypical shape. The notification may be output on the display device, for example. In some examples, the notification may include a prompt for an operator to initiate a manual segmentation or acquire a different image to enter to the segmentation model, and the original segmentation output by the segmentation model may be discarded. In this way, when the confidence metric indicates the segmentation has an atypical shape, the segmentation may be discarded and not used in any further downstream processes. Method 700 then ends.

Thus, method 700 provides for the calculation of a confidence metric of a segmentation generated by a segmentation model that indicates how well a shape of the segmentation can be encoded by an encoding of one or more principal modes of shape variation of a set of previously determined segmentations. The confidence metric may thus be indicative of how well a small number of dimensions (e.g., 2-4) found using principal component analysis can be used to reconstruct the shape of the segmentation. If the shape/contour of the segmentation output by the segmentation model cannot be reconstructed with a high degree of similarity to the original segmentation, the original segmentation is determined to fall outside the principal modes of shape variation established by a plurality of expert-confirmed segmentations, and thus the segmentation may be deemed atypical. As such, the atypical segmentation may be discarded and a new segmentation may be obtained (e.g., manually), which may avoid errors in downstream processes (such as strain measurements) that rely on an accurate segmentation of the ROI. To determine how well the shape of the segmentation can be encoded by the encoding of the one or more principal modes of shape variation, a distance between the reconstructed segmentation and the original segmentation may be calculated for each point of the reconstructed segmentation, as explained above. However, in other examples, to determine how well the shape of the segmentation can be encoded by the encoding of the one or more principal modes of shape variation, other metrics may be used, such as an area of the reconstructed segmentation relative to an area of the original segmentation, a position of a centroid of the reconstructed segmentation relative to a positon of a centroid of the original segmentation, etc.

The disclosed method of calculating the confidence metric of a segmentation of a given anatomical ROI may provide several advantages. As explained previously, the confidence metric is determined based on a mean shape and one or more principal modes of variation of the anatomical ROI, each determined from a plurality of expert-generated segmentations. As such, the mean shape and principal modes of variation may be based on segmentations themselves, rather than expected shapes or known anatomical features of the anatomical ROI. This may be beneficial because segmentations for various processes (e.g., strain measurement, ejection fraction calculation) may be based on boundaries of the anatomical ROI in a given imaging plane and may not fully represent the entire shape of the anatomical feature in the patient. Thus, the determination of atypical versus typical segmentation shapes may be more accurate than comparisons to actual anatomical features. Further, by defining the mean shape and each segmentation as a collection of points plotted on a 2D axis, the elimination of non-shape variations and the distance calculation (e.g., between the original segmentation and reconstructed segmentation) may be simple and not demand high processing power, allowing the confidence module to execute on a wide variety of devices.

A technical effect of calculating a confidence metric of a segmentation output by a segmentation model is that atypical segmentations can be identified and discarded automatically without requiring expert confirmation of each segmentation output by the segmentation model, thereby reducing errors in downstream processes that use the segmentation. In doing so, an efficiency of a computing device executing the downstream processes may be increased by avoiding unnecessary processing associated with performing functions (e.g., strain measurements) with atypical segmentations.

The disclosure also provides support for a method, comprising: receiving a segmentation of a region of interest (ROI) of a medical image, the segmentation output by a segmentation model, calculating a confidence metric of the segmentation that indicates how well a shape of the segmentation can be encoded by an encoding of one or more principal modes of shape variation of a set of previously determined segmentations of the ROI, responsive to the confidence metric meeting a predetermined condition relative to a threshold, displaying the segmentation, storing the segmentation, and/or using the segmentation in one or more downstream processes, otherwise, prompting a user to perform a manual segmentation. In a first example of the method, the medical image comprises an ultrasound image. In a second example of the method, optionally including the first example, the ROI comprises a left ventricle of a heart of a patient and the one or more downstream processes comprises a strain measurement. In a third example of the method, optionally including one or both of the first and second examples, the segmentation model is a deep learning model trained to output the segmentation based on the medical image. In a fourth example of the method, optionally including one or more or each of the first through third examples, calculating the confidence metric comprises registering the segmentation to a mean shape of the ROI to reduce non-shape variations of the segmentation relative to the mean shape. In a fifth example of the method, optionally including one or more or each of the first through fourth examples, registering the segmentation to the mean shape includes performing a Procrustes registration. In a sixth example of the method, optionally including one or more or each of the first through fifth examples, the mean shape is determined based on the set of previously determined segmentations of the ROI. In a seventh example of the method, optionally including one or more or each of the first through sixth examples, calculating the confidence metric of the segmentation that indicates how well the shape of the segmentation can be encoded by the encoding of one or more principal modes of shape variation of the set of previously determined segmentations of the ROI comprises generating a reconstructed segmentation by transforming the segmentation, after the registering to the mean shape, to a lower dimensional space and back using the encoding of one or more principal modes of shape variation. In an eighth example of the method, optionally including one or more or each of the first through seventh examples, calculating the confidence metric further comprises calculating a distance between the segmentation output by the segmentation model and the reconstructed segmentation. In a ninth example of the method, optionally including one or more or each of the first through eighth examples, the encoding of the one or more principal modes of shape variation is determined based on a principal component analysis performed on the set of previously determined segmentations of the ROI. In a tenth example of the method, optionally including one or more or each of the first through ninth examples, the set of previously determined segmentations of the ROI comprise ground truth segmentations applied to train the segmentation model.

The disclosure also provides support for a system, comprising: a processor, and non-transitory memory storing instructions executable by the processor to: enter a medical image of a patient including a region of interest (ROI) as input to a segmentation model, receive a segmentation of the ROI from the segmentation model, register the segmentation to a mean shape of the ROI determined from a plurality of prior segmentations of the ROI, to thereby form a registered segmentation, generate a reconstructed segmentation from the registered segmentation using one or more principal modes of variation determined from the plurality of prior segmentations of the ROI, calculate a confidence metric of the segmentation based on the reconstructed segmentation, and responsive to the confidence metric meeting a predetermined condition relative to a threshold, display the segmentation, store the segmentation, and/or use the segmentation in one or more downstream processes. In a first example of the system, the medical image comprises an ultrasound image, wherein the ROI comprises a left ventricle of a heart of the patient, and wherein the one or more downstream processes comprises a strain measurement. In a second example of the system, optionally including the first example, the instructions are executable to, responsive to the confidence metric not meeting the predetermined condition relative to the threshold, discard the segmentation and/or prompt a user to manually generate a new segmentation. In a third example of the system, optionally including one or both of the first and second examples, calculating the confidence metric of the segmentation based on the reconstructed segmentation comprises calculating a distance between reconstructed segmentation and the segmentation from the segmentation model. In a fourth example of the system, optionally including one or more or each of the first through third examples, the plurality of prior segmentations of the ROI comprise ground truth segmentations applied to train the segmentation model.

The disclosure also provides support for a method, comprising: training a segmentation model to segment a region of interest (ROI) in medical images by entering training data as input to the segmentation model, the training data comprising a plurality of medical images and a plurality of expert-generated segmentations of the ROI each associated with a respective medical image of the plurality of medical images, determining a mean shape of the ROI from the plurality of expert-generated segmentations, determining one or more principal modes of shape variation of the ROI from the plurality of expert-generated segmentations, and during inference with the trained segmentation model, deploying the mean shape and the one or more principal modes of variation to determine a confidence metric of a segmentation of the ROI output by the trained segmentation model. In a first example of the method, determining the mean shape of the ROI from the plurality of expert-generated segmentations comprises identifying an initial mean shape, registering each segmentation of the plurality of expert-generated segmentations to the initial mean shape using Procrustes registration, and calculating a new mean shape from the registered segmentations, and iteratively repeating the Procrustes registration and calculation of the new mean shape until a stable mean shape is generated. In a second example of the method, optionally including the first example, the medical images comprise ultrasound images. In a third example of the method, optionally including one or both of the first and second examples, the ROI comprises a left ventricle of a heart.

When introducing elements of various embodiments of the present disclosure, the articles "a," "an," and "the" are intended to mean that there are one or more of the elements. The terms "first," "second," and the like, do not denote any order, quantity, or importance, but rather are used to distinguish one element from another. The terms "comprising," "including," and "having" are intended to be inclusive and mean that there may be additional elements other than the listed elements. As the terms "connected to," "coupled to," etc. are used herein, one object (e.g., a material, element, structure, member, etc.) can be connected to or coupled to another object regardless of whether the one object is directly connected or coupled to the other object or whether there are one or more intervening objects between the one object and the other object. In addition, it should be understood that references to "one embodiment" or "an embodiment" of the present disclosure are not intended to be interpreted as excluding the existence of additional embodiments that also incorporate the recited features.

In addition to any previously indicated modification, numerous other variations and alternative arrangements may be devised by those skilled in the art without departing from the spirit and scope of this description, and appended claims are intended to cover such modifications and arrangements. Thus, while the information has been described above with particularity and detail in connection with what is presently deemed to be the most practical and preferred aspects, it will be apparent to those of ordinary skill in the art that numerous modifications, including, but not limited to, form, function, manner of operation and use may be made without departing from the principles and concepts set forth herein. Also, as used herein, the examples and embodiments, in all respects, are meant to be illustrative only and should not be construed to be limiting in any manner.

The invention claimed is:

1. A method, comprising:
receiving a segmentation of a region of interest (ROI) of a medical image, the segmentation output by a segmentation model;
calculating a confidence metric of the segmentation that indicates how well a shape of the segmentation can be encoded by an encoding of one or more principal modes of shape variation of a set of previously determined segmentations of the ROI;
responsive to the confidence metric meeting a predetermined condition relative to a threshold, displaying the segmentation, storing the segmentation, and/or using the segmentation in one or more downstream processes; otherwise, prompting a user to perform a manual segmentation.

2. The method of claim 1, wherein the medical image comprises an ultrasound image.

3. The method of claim 1, wherein the ROI comprises a left ventricle of a heart of a patient and the one or more downstream processes comprises a strain measurement.

4. The method of claim 1, wherein the segmentation model is a deep learning model trained to output the segmentation based on the medical image.

5. The method of claim 1, wherein calculating the confidence metric comprises registering the segmentation to a mean shape of the ROI to reduce non-shape variations of the segmentation relative to the mean shape.

6. The method of claim 5, wherein registering the segmentation to the mean shape includes performing a Procrustes registration.

7. The method of claim 5, wherein the mean shape is determined based on the set of previously determined segmentations of the ROI.

8. The method of claim 5, wherein calculating the confidence metric of the segmentation that indicates how well the shape of the segmentation can be encoded by the encoding of one or more principal modes of shape variation of the set of previously determined segmentations of the ROI comprises generating a reconstructed segmentation by transforming the segmentation, after the registering to the mean shape, to a lower dimensional space and back using the encoding of one or more principal modes of shape variation.

9. The method of claim 8, wherein calculating the confidence metric further comprises calculating a distance between the segmentation output by the segmentation model and the reconstructed segmentation.

10. The method of claim 8, wherein the encoding of the one or more principal modes of shape variation is determined based on a principal component analysis performed on the set of previously determined segmentations of the ROI.

11. The method of claim 10, wherein the set of previously determined segmentations of the ROI comprise ground truth segmentations applied to train the segmentation model.

12. A system, comprising:
a processor; and
non-transitory memory storing instructions executable by the processor to:
enter a medical image of a patient including a region of interest (ROI) as input to a segmentation model;
receive a segmentation of the ROI from the segmentation model;
register the segmentation to a mean shape of the ROI determined from a plurality of prior segmentations of the ROI, to thereby form a registered segmentation;
generate a reconstructed segmentation from the registered segmentation using one or more principal modes of variation determined from the plurality of prior segmentations of the ROI;
calculate a confidence metric of the segmentation based on the reconstructed segmentation; and
responsive to the confidence metric meeting a predetermined condition relative to a threshold, display the segmentation, store the segmentation, and/or use the segmentation in one or more downstream processes.

13. The system of claim 12, wherein the medical image comprises an ultrasound image, wherein the ROI comprises a left ventricle of a heart of the patient, and wherein the one or more downstream processes comprises a strain measurement.

14. The system of claim 12, wherein the instructions are executable to, responsive to the confidence metric not meeting the predetermined condition relative to the threshold, discard the segmentation and/or prompt a user to manually generate a new segmentation.

15. The system of claim 12, wherein calculating the confidence metric of the segmentation based on the reconstructed segmentation comprises calculating a distance between reconstructed segmentation and the segmentation from the segmentation model.

16. The system of claim 12, wherein the plurality of prior segmentations of the ROI comprise ground truth segmentations applied to train the segmentation model.

17. A method, comprising:
   training a segmentation model to segment a region of interest (ROI) in medical images by entering training data as input to the segmentation model, the training data comprising a plurality of medical images and a plurality of expert-generated segmentations of the ROI each associated with a respective medical image of the plurality of medical images;
   determining a mean shape of the ROI from the plurality of expert-generated segmentations;
   determining one or more principal modes of shape variation of the ROI from the plurality of expert-generated segmentations; and
   during inference with the trained segmentation model, deploying the mean shape and the one or more principal modes of variation to determine a confidence metric of a segmentation of the ROI output by the trained segmentation model.

18. The method of claim 17, wherein determining the mean shape of the ROI from the plurality of expert-generated segmentations comprises identifying an initial mean shape, registering each segmentation of the plurality of expert-generated segmentations to the initial mean shape using Procrustes registration, and calculating a new mean shape from the registered segmentations, and iteratively repeating the Procrustes registration and calculation of the new mean shape until a stable mean shape is generated.

19. The method of claim 17, wherein the medical images comprise ultrasound images.

20. The method of claim 17, wherein the ROI comprises a left ventricle of a heart.

\* \* \* \* \*